US006177163B1

(12) United States Patent
Blok et al.

(10) Patent No.: US 6,177,163 B1
(45) Date of Patent: Jan. 23, 2001

(54) MARKABLE REPOSITIONABLE ADHESIVE SHEET DISPENSING ROLL FOR USE IN AN INDUSTRIAL SETTING

(75) Inventors: Lana M. Blok, Bayside; Larry E. Wenzler, Oak Creek; Gene A. Wright, Pewaukee, all of WI (US)

(73) Assignee: Tricor Direct, Inc., Branford, CT (US)

( * ) Notice: Under 35 U.S.C. 154(b), the term of this patent shall be extended for 0 days.

(21) Appl. No.: 09/102,337

(22) Filed: Jun. 22, 1998

(51) Int. Cl.[7] .............................. B32B 9/00; B32B 31/00

(52) U.S. Cl. ........................ 428/40.1; 156/268; 156/269; 156/271; 156/277; 428/41.3; 428/41.7; 428/41.8; 428/42.2; 428/42.3; 428/906; 428/914

(58) Field of Search ................................ 428/40.1, 41.3, 428/41.7, 41.8, 47, 906, 914, 43, 42.3, 42.2, 44, 77, 78; 156/250, 269, 268, 271, 522, 277

(56) References Cited

U.S. PATENT DOCUMENTS

| | | | | |
|---|---|---|---|---|
| 1,965,289 | | 7/1934 | Humphner | 41/33 |
| 2,278,673 | | 4/1942 | Savada et al. | 154/43 |
| 3,885,070 | | 5/1975 | Chapman | 428/42 |
| 4,032,679 | | 6/1977 | Aoyagi | 428/42 |
| 4,055,249 | | 10/1977 | Kojima | 206/447 |
| 4,060,168 | | 11/1977 | Romagnoli | 206/216 |
| 4,188,250 | | 2/1980 | Grass | 156/253 |
| 4,317,852 | | 3/1982 | Ogden | 428/40 |
| 4,584,219 | | 4/1986 | Baartmans | 428/42 |
| 4,968,540 | | 11/1990 | Linsenbigler | 428/5 |
| 5,182,152 | | 1/1993 | Ericson | 428/42 |
| 5,220,858 | * | 6/1993 | Allen et al. | 83/880 |
| 5,225,260 | * | 7/1993 | McNaul et al. | 428/40.7 |
| 5,262,216 | | 11/1993 | Popat et al. | 428/42 |
| 5,279,875 | | 1/1994 | Juszak et al. | 428/42 |
| 5,484,168 | | 1/1996 | Chigot | 283/67 |
| 5,512,343 | | 4/1996 | Shaw | 428/40 |
| 5,601,313 | | 2/1997 | Konkol et al. | 283/81 |
| 5,686,159 | * | 11/1997 | Langan | 428/40.1 |
| 5,704,648 | | 1/1998 | Brown et al. | 283/81 |
| 5,827,591 | * | 10/1998 | Blok et al. | 428/41.7 |
| 5,882,753 | * | 3/1999 | Pedginski et al. | 428/40.7 |
| 5,935,670 | * | 8/1999 | Downs | 428/40.1 |

FOREIGN PATENT DOCUMENTS 0 431 825 A2 6/1991 (EP) .

* cited by examiner

*Primary Examiner*—Nasser Ahmad
*Assistant Examiner*—Derek Jessen
(74) *Attorney, Agent, or Firm*—Whyte Hirschboeck Dudek SC

(57) ABSTRACT

Adhesive sheet assemblies are described comprising a continuous carrier in roll form, a series of longitudinally spaced adhesive sheets on the carrier, and at least one cut in the web defining, for each adhesive sheet, one cover piece cut from the carrier such that the cover piece has an outer peripheral edge within the first portion on the backside of the adhesive sheet, so that the cover piece may be separated from the web and retained on the first portion of the backside of the adhesive sheet when the adhesive sheet is peeled off the carrier due to adhesion between the cover piece and the adhesive sheet. Preferably, at least 40 percent of the total length of the outer peripheral edge of each cover piece is substantially in registration with the outer peripheral edge of the adhesive sheet to which it is adhered. Each adhesive sheet comprises a flexible polymer film, polymer-reinforced sheet or cloth and is capable of being removed from a substrate to which it is adhered without leaving an adhesive residue on the substrate. Kits for dispensing the adhesive sheet assembly, processes for making the adhesive sheet assembly and processes for printing the same are also described.

19 Claims, 7 Drawing Sheets

MARKABLE REPOSITIONABLE ADHESIVE SHEET DISPENSING ROLL FOR USE IN AN INDUSTRIAL SETTING

BACKGROUND OF THE INVENTION

1. Field of the Invention

This invention is in the field of adhesive sheets in roll form and processes for making them.

2. Description of Related Art

Label assemblies in which a release agent coated carrier sheet has a plurality of pressure sensitive adhesive coated labels adhered to it are known. Such label assemblies are available in sheet or roll form with, or without, a blank facing capable of receiving markings. Such label assemblies are often used to mark folders, address envelopes, label containers, label file cabinets, label shelves and so forth. Typically, such labels are made of paper and are removed from the carrier sheet by bending the carrier sheet and "picking" at the label.

Those known label assemblies are often unsatisfactory for use in an industrial setting. Paper is adversely affected by solvents, oils and humidity, resulting in staining and curling, is easily torn and damaged and often has insufficient conformability to nonflat surfaces. The adhesive used is generally either ineffective to hold the label on a nonsmooth or contaminated surface, or leaves an adhesive residue on the surface after it is removed, which interferes with use as a temporary or repositionable label.

Although paper labels coated within a low-tack repositionable pressure-sensitive adhesive have been a phenomenal success in the office setting in which the note is typically applied to a paper surface, the inventors have found that such notes perform poorly on substrates which have an irregular surface and/or have a surface with low surface energy or contamination which reduces the effectiveness of the adhesive. Such surfaces are prevalent in industrial settings, research and development laboratories, the construction industry, warehouses, and other settings which require the ability to post temporary notes on non-paper surfaces.

Such settings also require that the labels be dispensed in a manner that facilitates removal from carrier and application to the substrate. Workers and technicians often are required to wear gloves, they often are in situations in which they have only one hand available for removing and applying the note and they are often pressed for time. The typical assemblies used to dispense self-adhesive labels are not satisfactory for meeting these end use requirements.

SUMMARY OF THE INVENTION

The problem of providing robust markable removable printable adhesive sheets in a form that can be easily applied in an industrial environment is solved by the present invention.

One aspect of this invention are adhesive sheet assemblies comprising:

a continuous carrier of flexible sheet material in roll form, the carrier having two substantially parallel side edges extending in a longitudinal direction of the carrier;

a series of longitudinally spaced adhesive sheets on the carrier, each adhesive sheet having a front side facing away from the carrier capable of receiving markings, a back side facing toward the carrier substantially covered with a pressure sensitive adhesive, the back side having a first portion and a second portion;

at least one cut in the carrier defining, for each adhesive sheet, one cover piece cut from the web such that the cover piece has an outer peripheral edge within the first portion on the backside of the adhesive sheet, so that the cover piece may be separated from the web and retained on the first portion of the backside of the adhesive sheet when the adhesive sheet is peeled off the carrier due to adhesion between the cover piece and the adhesive sheet.

Another aspect of this invention is a process for making the adhesive sheet assemblies of the present invention comprising:

A. Adhering a continuous carrier having two substantially parallel side edges extending in a longitudinal direction to the back side of a continuous flexible polymer film, polymer-reinforced sheet or cloth having a Taber stiffness of not less than 0.03 measured according to ASTM D747 A and having two substantially parallel side edges extending in a longitudinal direction, a front side facing away from the carrier capable of receiving markings, a back side facing toward the carrier substantially covered with a pressure sensitive adhesive such that the carrier substantially covers the pressure-sensitive adhesive to form a continuous web having a front side capable of receiving markings, a continuous carrier on the back side, and two substantially parallel side edges extending in a longitudinal direction of the web;

B. Scoring the front side of the web to serially cut out spaced apart adhesive sheets adhered to the carrier; and C. Scoring the back side of the web to cut out a cover piece from the web having an outer peripheral edge which has at least 40, preferably at least 50, more preferably at least 60, percent of its total length in registration with the scoring of step B.

These and other aspects of the invention are described in greater detail below.

DETAILED DESCRIPTION OF THE INVENTION

Figure 1:
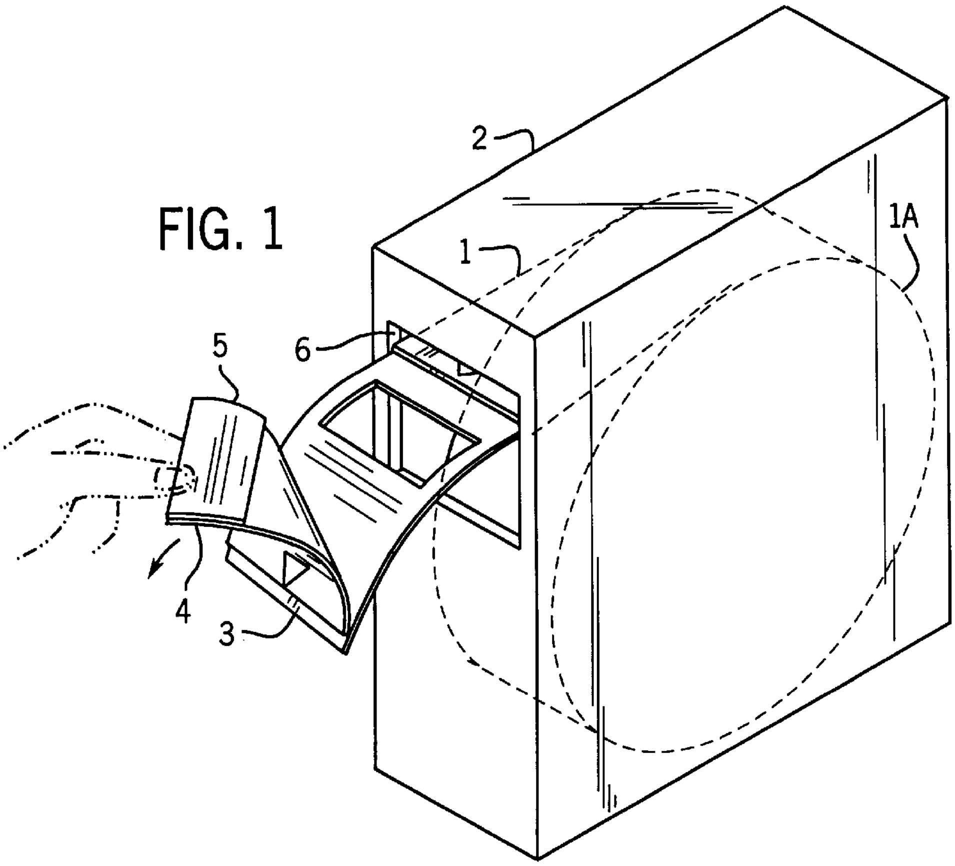
FIG. 1 shows a kit for dispensing adhesive sheets according to the present invention comprising the adhesive sheet assembly 1 according to the present invention in roll form and a dispenser 2.

In a preferred embodiment, at least 40, preferably at least 50, and even more preferably at least 60, percent of the total length of the outer peripheral edge of each cover piece is substantially in registration with the outer peripheral edge of the adhesive sheet to which it is adhered. As used herein, the term "substantially in registration" means that the outer peripheral edge or score line of the cover piece follows, and is lined up with, the configuration of the outer peripheral edge of the adhesive sheet so that their respective edges are within a short distance, preferably within 1 mm, from one another over the specified length.

In the same or another preferred embodiment, the at least one cut does not extend through the substantially parallel side edges of the continuous carrier.

In the same or another embodiment, each longitudinally spaced adhesive sheet on the web is preferably not perforated parallel to, and within a few millimeters of, the outer peripheral edge of the cover piece adhered to that adhesive sheet.

Preferably, each adhesive sheet comprises a flexible polymer film, polymer-reinforced sheet or cloth having a Taber stiffness of not less than 0.03 measured according to ASTM D747 A. The pressure sensitive adhesive also preferably has an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000. Each adhesive sheet is preferably capable of being removed from a substrate to which it is adhered without leaving an adhesive residue on the substrate.

The carrier may be any material that has less adhesion to the adhesive than the adhesive substrate and has sufficient strength to resist tearing as it is removed from the adhesive. The release property of the carrier may be inherent in the material of the carrier or may be due to the presence of a release agent on the surface of the carrier, or both. Materials having an inherent release property include those made of a synthetic nonpolar material, such as homopolymers derived from unsaturated olefins, e.g., polyethylene, polypropylene, etc., and release agents include, for example, silicone-containing agents. The release sheet preferably has a Taber stiffness measured according to ASTM D747 greater than that of the adhesive sheet.

The adhesive sheets are preferably made of a flexible polymer film, polymer-reinforced sheet or cloth having a Taber stiffness of not less than 0.03, preferably not less than 0.05, measured according to ASTM D747. The polymer film, polymer-reinforced sheet or cloth preferably has a tensile strength of at least 2000, preferably 4000 and more preferably 5000, N/m, up to any value, such as up to 8000 N/m and it also preferably has a minimum elongation of at least about 4 percent and more preferably at least about 50 percent, the tensile strength and percent minimum elongation being measured according to ASTM D1000.

The film, sheet or cloth may be selected from a wide range of materials. Examples include polymer films made of natural and/or synthetic polar and/or nonpolar materials such as polyolefins, e.g., homopolymers and interpolymers derived from substituted and unsubstituted olefinically unsaturated hydrocarbons including ethylene, propylene, styrene, butadiene, dicyclopentadiene, etc., and materials which contain polar functional groups such as hydroxys, etherals, carbonyls, carboxylic acids (including salts thereof), carboxylic acid esters (including thio esters), carboxylic anhydrides, amides, amines, etc. Synthetic materials having polar groups are preferred. Illustrative examples include polyesters, polyamides, and carboxylated styrene-butadiene polymers.

The polymer-reinforced sheets comprise at least one of the natural or synthetic polymers described above together with a reinforcing material. The reinforcing material may be organic or inorganic. Illustrative organic materials include natural materials such as cellulosic fibers such as cotton, paper, hemp, etc., and synthetic materials such as fibers made of the aforementioned natural or synthetic polymers. Inorganic materials include any of the many well known fillers used in the plastics industry such as silica, talc, mica, etc.

The cloth is one that is woven from natural or synthetic fibers. The natural fibers are preferably cotton and the synthetic fibers are preferably polar interpolymers derived from olefinically unsaturated hydrocarbons.

The front surface of the film, sheet or cloth is capable of receiving markings. This capability is either an inherent property of the film, sheet or cloth or is obtained by a treatment of its surface using conventional means known in the art. Preferably the front surface is capable of receiving markings with a ballpoint pen, a marking pen or a pencil. It is also preferable that the front surface be capable of absorbing ink such as ballpoint or marking pen ink into the surface to reduce potential smearing of the ink after it is applied.

The adhesive may be applied to the above films, sheets and cloths in a conventional manner, such as by spraying, knife coating, roller coating, casting, drum coating, extrusion coating, coextrusion coating, and the like or unsupported pressure sensitive adhesive may be transferred or laminated to the film, sheet or cloth. The adhesive is preferably coated in a manner which covers substantially the entire back side of the film, sheet or cloth. The adhesive is preferably coated at a thickness in the range from 0.5 to 3 mil, more preferably in the range from 1 to 3 mil.

The adhesive combines an initial tack value of at least 200 g according to ASTM D2979 measured on a Polyken™ probe tack tester, an adhesive strength of at least 100 N/m according to ASTM D1000 and an adhesive tack sufficient to prevent conformability failure of the adhesive sheet after 10 hours conformability testing (which is further described below) and yet having a cohesive strength sufficient to allow removal of the adhesive sheet from the substrate without leaving any residue behind on the substrate.

Typically, the adhesives which are useful in the present invention comprise an elastomeric polymer. Examples of useful elastomeric polymers include natural rubber, styrene/diene rubber such as styrene/butadiene block copolymer, styrene/isoprene block copolymer, styrene/ethylene-butylene block copolymer, polyisobutylene rubber, and acrylic elastomer. Specific examples of elastomeric polymers include Heveacrumb™ (natural rubber) available from Herron & Meyer, Synpol™ (a styrene/butadiene copolymer rubber) available from Ameripol Synpol Corp., Vistanex™ (a polyisobutylene elastomer) available from Exxon Chemical, Duro-Tak™ (an acrylic resin elastomeric adhesive) available from National Starch and Chemical Corp., and Aroset™ (a modified acrylic resin elastomeric adhesive) available from Ashland Chemical, Inc.

The adhesives useful in the present invention also may contain one or more tackifier resins such as rosin, hydrogenated rosin, rosin ester, synthetic hydrocarbon tackifier, and low molecular weight, low glass transition temperature polycarboxylic acid esters. Preferred tackifiers include rosin esters, polyterpenes, and polybutenes. Specific examples of tackifier resins include Foral™ (a rosin ester tackifier) and Piccolyte™ (a polyterpene tackifier), both available from Hercules, Inc., and Indopol™ (a polybutene tackifier) available from Amoco Chemicals Corp.

Antioxidants are employed to the extent necessary to prevent degradation of the adhesive with time. Examples include hydroquinone and hindered phenol antioxidants. Specific examples of antioxidants include Santovar A (2,5-di-tert-amylhydroquinone antioxidant) available from Flexsys America L.P., Agerite Resin D (polymerized 1,2-dihydro-2,2,4-trimethylquinoline monomer) available from R. T. Vanderbilt Co. and Wingstay L (butylated reaction product of p-cresol and dicyclopentadiene) available from Goodyear Tire & Rubber Co.

Adhesive formulations may include a plasticizer, such as a polyketone resin, and/or a surfactant, such as Tween™, a polysorbate 20 surfactant available from ICI Specialties Mfg.

When the adhesive contains a tackifier, the tackifier may be present in a wide range of amounts, depending on the amount required to achieve the required initial tack value, adhesive tack and adhesive strength. In one embodiment, the adhesive has a weight ratio of tackifier to elastomer in the range from 0.5 to 2.0:1, preferably in the range from 0.8 to 1.8:1.

The adhesive has an initial tack value of at least 200 g, preferably at least 300 g, measured according to ASTM D2979 on a Polyken™ probe tack tester, an adhesive tack sufficient to prevent conformability failure of the adhesive sheet after 10 hours, preferably after 24 hours, conformability testing (described below), and an adhesive strength of at least 100 N/m, preferably at least 200 N/m, according to ASTM D1000.

The adhesive preferably has a high cohesive strength to prevent adhesive residue from remaining on the substrate when the adhesive sheet is removed. One method for determining cohesive strength is to conduct a shear strength test according to ASTM D3654-88, PSTC-7 (PSTC refers to the Pressure Sensitive Tape Council) to determine whether the adhesive undergoes cohesive failure at the conclusion of that test. This test is further described below.

For applying the adhesive to an adhesive sheet, appropriate types and amounts of curing agent, accelerator and solvent are typically included in the adhesive formulation. Examples of curing agents include zinc oxide, such as ASARCO available from Jenson-Sauders Associates, Inc., and melamine resin such as Uformite™ available from Reichhold Chemical Coating Division. Examples of accelerators include zinc dithiocarbamates such as Methyl Zimate™ (zinc dimethyldithiocarbamate) and thiuram sulfides such as Sulfads™ (dipentamethylene thiuram hexasulfide), both available from R.T. Vanderbilt Co. Examples of useful solvents include toluene, heptane, xylene, methyl ethyl ketone, isopropyl alcohol and ethyl acetate.

In one preferred embodiment of this invention, the adhesive formulation used to make the adhesive sheets comprises at least one elastomer, at least one tackifier, at least one antioxidant, at least one curing agent, at least one accelerator, and at least one solvent. The elastomer is preferably present in an amount of at least 5 wt %, more preferably at least 10 wt %, up to 25 wt %, more preferably up to 20 wt %. The tackifier is preferably present in an amount of at least 5 wt %, more preferably at least 10 wt %, up to 40 wt %, more preferably up to 30 wt %. The curing agent is preferably present in an amount of at least 0.1 wt % up to 10 wt %. The accelerator is preferably present in an amount from 0.1 to 1 wt %.

In another preferred embodiment of this invention, the adhesive formulation used to make the adhesive sheets comprises at least one acrylic-based adhesive in an appropriate solvent.

One approach to preparing an adhesive for use in this invention is to add elastomeric polymer, antioxidant, curing agent and accelerator to a tackifier resin which has been thinned with an appropriate solvent, adding additional appropriate solvent as needed.

Curing of the adhesive may be activated by any conventional method, such as by exposure to air, elevated temperatures and/or radiation. Examples of radiation include ultraviolet light and actinic radiation. Curing via exposure to radiation includes the use of curing initiators which generate sufficient free radicals upon exposure to the selected radiation to initiate curing of the adhesive. Such initiators are well known in the polymer curing art.

In yet another preferred embodiment of this invention, the adhesive is formulated with little or no solvent for application as a hot melt thermoplastic adhesive. Hot melt thermoplastic adhesives typically contain little or no solvent. Any of a wide range of thermoplastic adhesives may be used as long as they comply with the conditions set forth above. They are commercially available from several manufacturers. Examples include HL-2194-X, HM-2703, HL-2198-X and HL-2268-X available from H. B. Fuller Co.; Duro-Tak™ 9820, 6123, 4136 and 1236 available from National Starch and Chemical Corp.; CA-501 (SIS/SBS), CA-502-4A (SIS/SBS), CA-503-A (SIS/SBS), CA-506 (SIS/SBS), C-X805-1 (Acrylic), C-882 (Acrylic), and C-X885 (Acrylic) available from Century International and H2091, H2114-01, and 801-375 available from Findley Adhesives, Inc. Suitable hot melt thermoplastic adhesives are also disclosed, for example, in U.S. Pat. No. 4,728,572, which is incorporated herein by reference.

FIGS. 1–7 show examples of embodiments of the invention and components for making those embodiments.

FIG. 1 shows a kit for dispensing adhesive sheets according to the present invention comprising the adhesive sheet assembly 1 according to the present invention in roll form 1A and a dispenser 2. The adhesive sheet assembly 1, shown in hidden view within dispenser 2, is comprised of a carrier 3 with a series of adhesive sheets 4 on one face of carrier 3. Each adhesive sheet 4 has a cover piece 5 for peeling adhesive sheet 4 from carrier 3. Dispenser 2 has a passageway 6 for withdrawing additional lengths of adhesive sheet assembly 1 from the roll 1A within dispenser 2.

Figure 2:
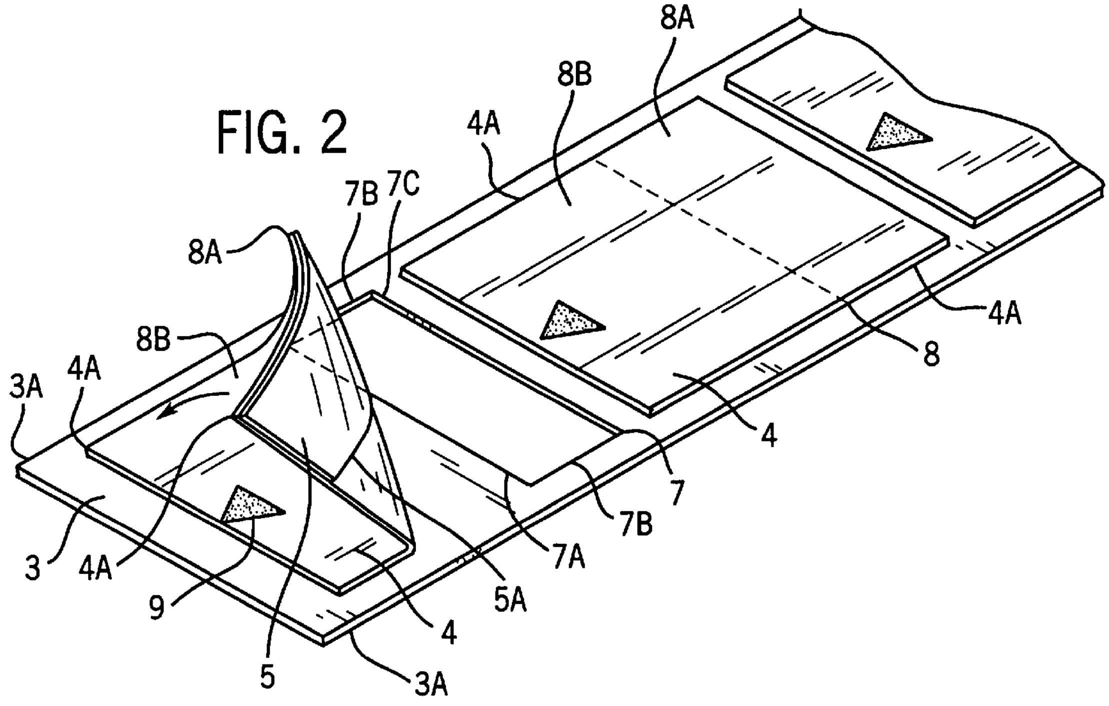
FIG. 2 shows an enlarged portion of the unrolled end of the adhesive sheet assembly 1 shown in FIG. 1 as an adhesive sheet 4 is removed.

FIG. 2 shows an enlarged portion of the unrolled end of the adhesive sheet assembly 1 shown in FIG. 1 as one adhesive sheet 4 is being removed and another adhesive sheet 4 prior to initiation of removal. The cut out peripheral edge 7 in carrier 3 corresponds in size, shape and position to the outer peripheral edge 5A of cover piece 5. Hidden transverse score line 8 corresponds to the portion of the length of cut out peripheral edge 7A that is not substantially in registration with the outer peripheral edge 4A of adhesive sheet 4. Transverse score line 8 divides adhesive sheet 4 into a first portion 8A and a second portion 8B. Cut out peripheral edges 7B and 7C correspond to the portions of the length of cut out peripheral edge 7 that are substantially in registration with the outer peripheral edge 4A of adhesive sheet 4. Cut out peripheral edge 7 does not intersect the two substantially parallel outer side edges 3A of carrier 3. Adhesive sheet 4 may optionally have printed on it insignia 9.

Figure 3:
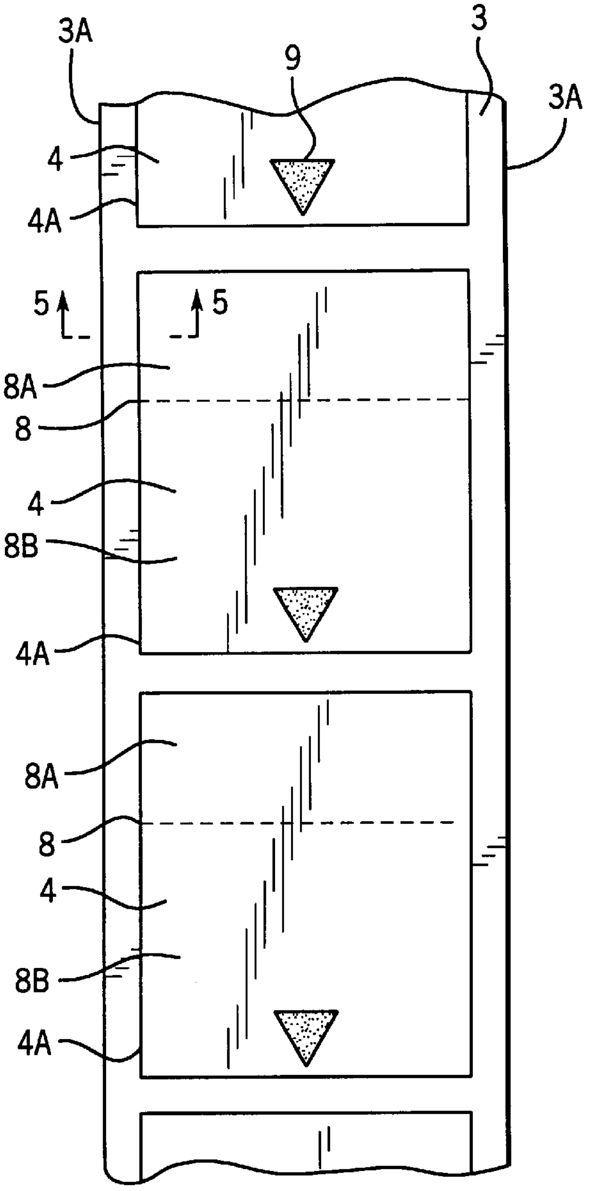
FIG. 3 shows the front side of an enlarged portion of the unrolled end of the adhesive sheet assembly 1 shown in FIG. 1.
Figure 4:
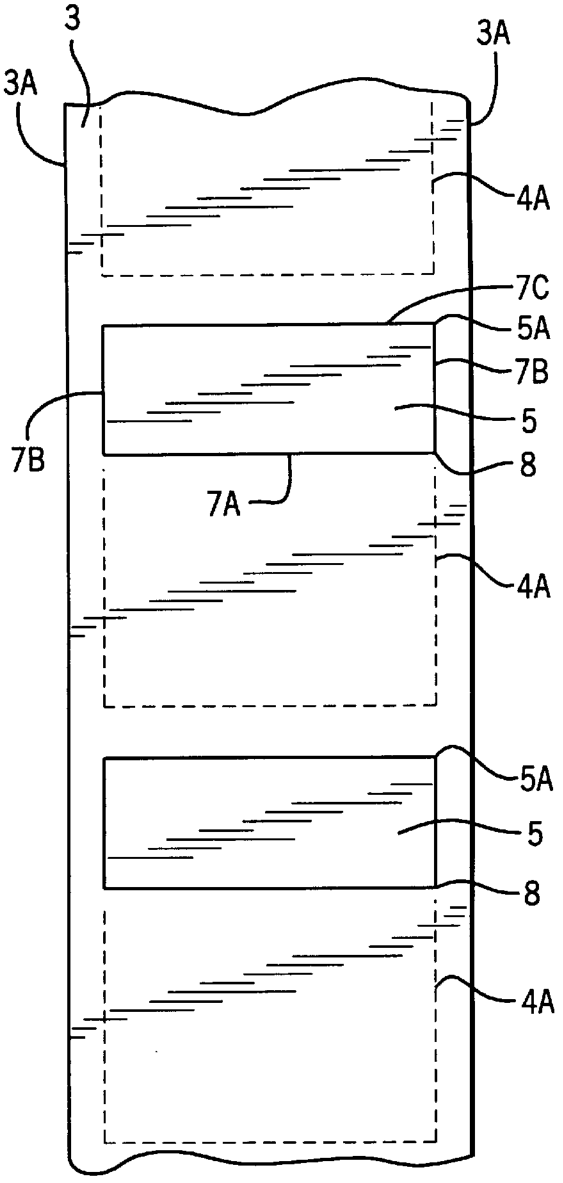
FIG. 4 shows the back side of the enlarged portion of the unrolled end of the adhesive sheet assembly 1 shown in FIG. 3.

FIGS. 3 and 4 show the front and back sides, respectively, of an enlarged portion of the unrolled end of the adhesive sheet assembly 1 shown in FIG. 1. These figures in particular show the correspondence between the outer peripheral edge 4A of adhesive sheet 4 and the outer peripheral edge 5A of cover piece 5 and their relationship to the first portion 8A and second portion 8B of adhesive sheet 4.

Figure 5:
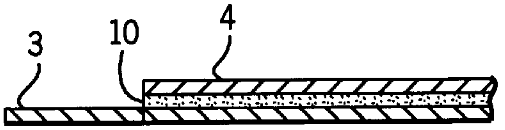
FIG. 5 shows an enlarged cross sectional view of the indicated portion of FIG. 3.

FIG. 5 shows an enlarged cross sectional view of the indicated portion of FIG. 3. Adhesive sheet 4 is adhered to carrier 3 with adhesive 10. Adhesive sheet 4, carrier 3, and adhesive 10 are selected so that adhesive 10 has a stronger adhesive bond to adhesive sheet 4 than to carrier 3.

Figure 6:
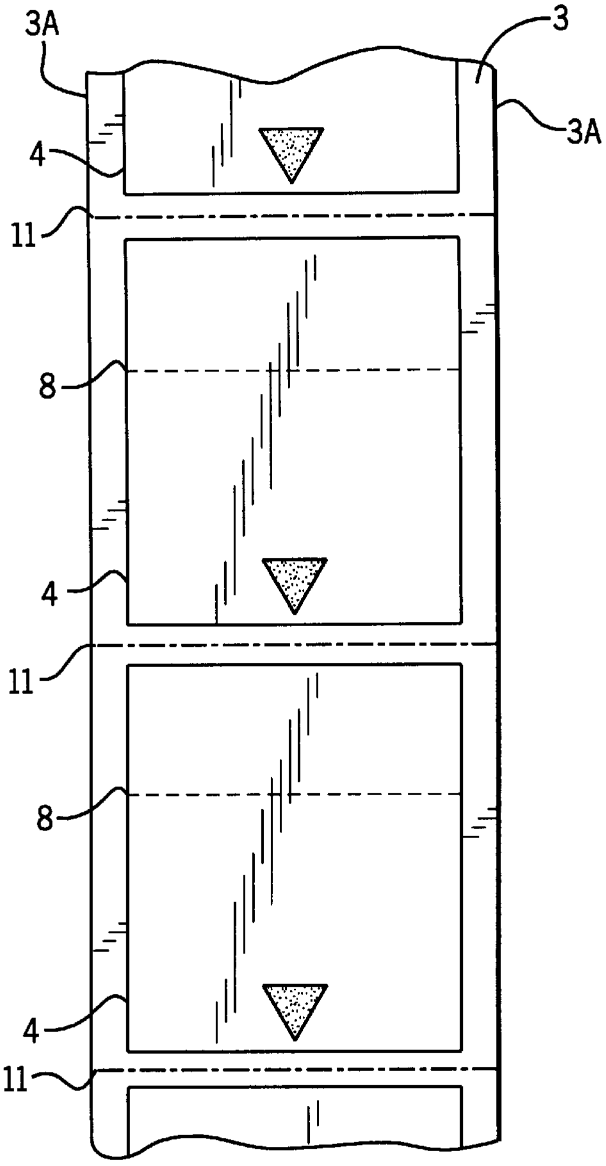
FIG. 6 shows an alternative embodiment of the front side of an enlarged portion of the unrolled end of the adhesive sheet assembly 1 which has perforations 11 between each adhesive sheet 4.

FIG. 6 shows an alternative embodiment of the front side of an enlarged portion of the unrolled end of the adhesive sheet assembly 1 which has perforations 11 between each adhesive sheet 4 to aid in separating one or more adhesive sheets 4 from the adhesive sheet assembly 1 prior to separating each adhesive sheet 4 from carrier 3.

Figure 7:
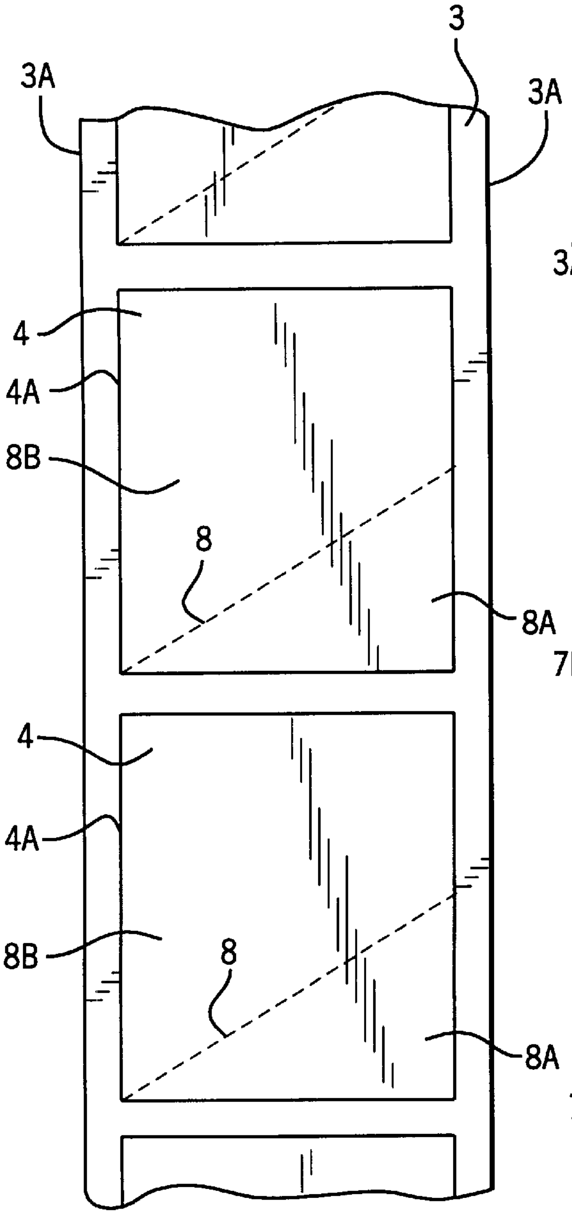
FIG. 7 shows another alternative embodiment of the front side of an enlarged portion of the unrolled end of the adhesive sheet assembly 1 in which each adhesive sheet 4 has a triangular cover piece 5 in hidden view behind each adhesive sheet.
Figure 8:
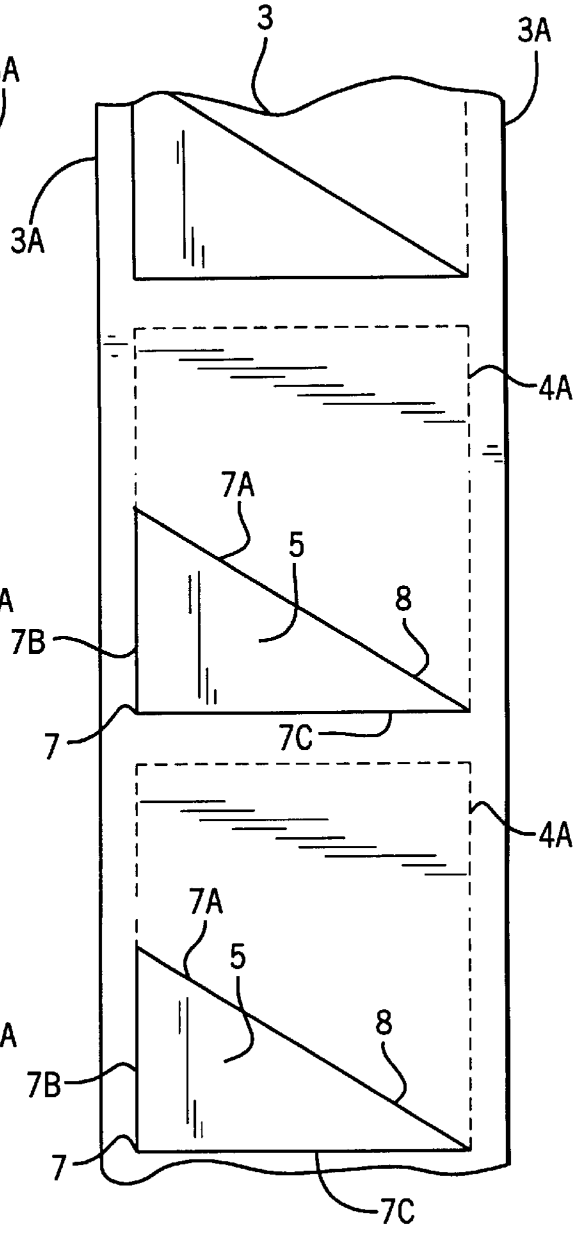
FIG. 8 shows the back side of the enlarged portion of the unrolled end of the adhesive sheet assembly 1 shown in FIG. 7 in which each triangular cover piece 5 is in exposed view.

FIGS. 7 and 8 show the front and back sides, respectively, of another alternative embodiment of an enlarged portion of the unrolled end of the adhesive sheet assembly 1 in which each adhesive sheet 4 has a triangular cover piece 5 shown in hidden view in FIG. 7 and in exposed view in FIG. 8. Transverse score line 8 divides adhesive sheet 4 into a first portion 8A and a second portion 8B. Cut out peripheral edges 7B and 7C correspond to the portions of the length of cut out peripheral edge 7 that are substantially in registration with the outer peripheral edge 4A of adhesive sheet 4. Cut out peripheral edge 7 does not intersect the two substantially parallel outer side edges 3A of carrier 3.

Figure 9:
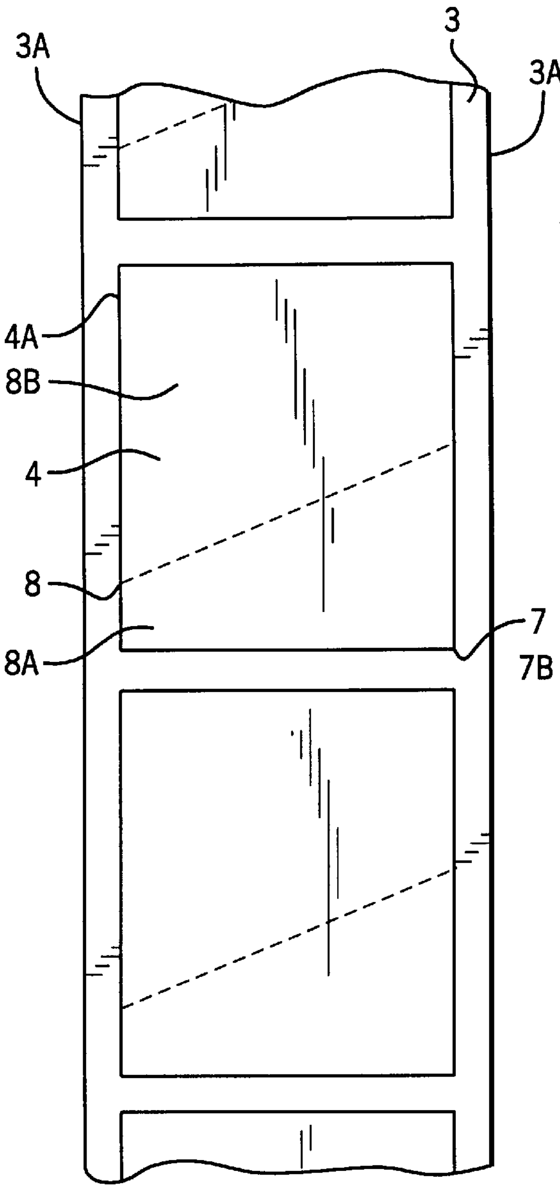
FIG. 9 shows another alternative embodiment of the front side of an enlarged portion of the unrolled end of the adhesive sheet assembly 1 in which each adhesive sheet 4 has a truncated triangular (i.e., rhomboid) cover piece 5 in hidden view behind each adhesive sheet.
Figure 10:
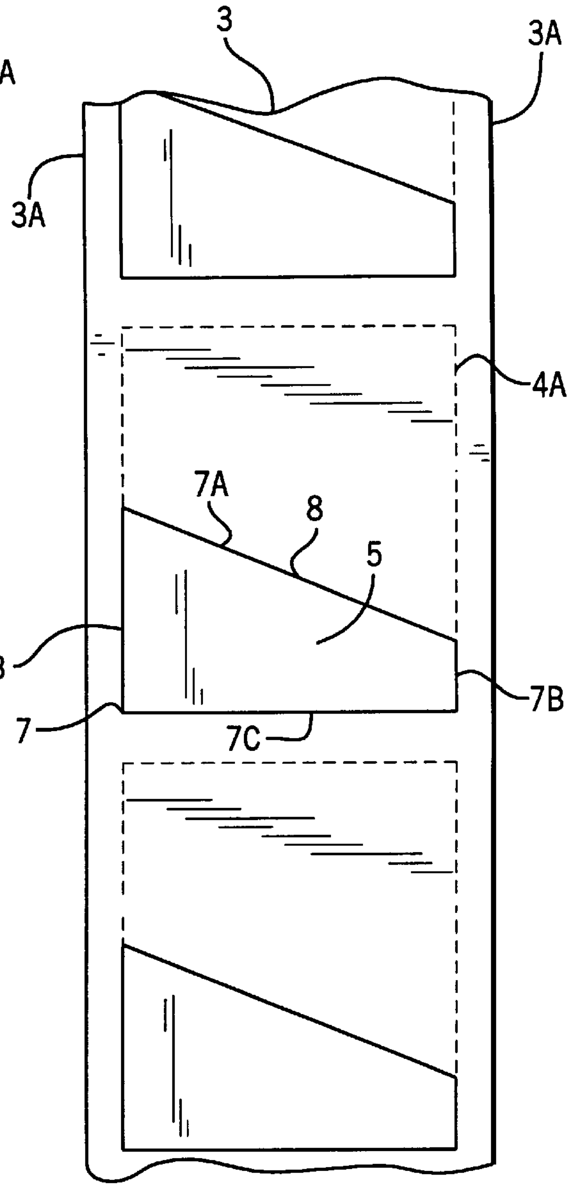
FIG. 10 shows the back side of the enlarged portion of the unrolled end of the adhesive sheet assembly 1 shown in FIG. 9 in which each truncated triangular cover piece 5 is in exposed view.

FIGS. 9 and 10 show the front and back sides, respectively, of another alternative embodiment of an enlarged portion of the unrolled end of the adhesive sheet assembly 1 in which each adhesive sheet 4 has a truncated triangular cover piece 5 shown in hidden view in FIG. 9 and in exposed view in FIG. 10. Transverse score line 8 divides adhesive sheet 4 into a first portion 8A and a second portion 8B. Cut out peripheral edges 7B and 7C correspond to the portions of the length of cut out peripheral edge 7 that are substantially in registration with the outer peripheral edge 4A of adhesive sheet 4. Cut out peripheral edge 7 does not intersect the two substantially parallel outer side edges 3A of carrier 3.

Figure 11:
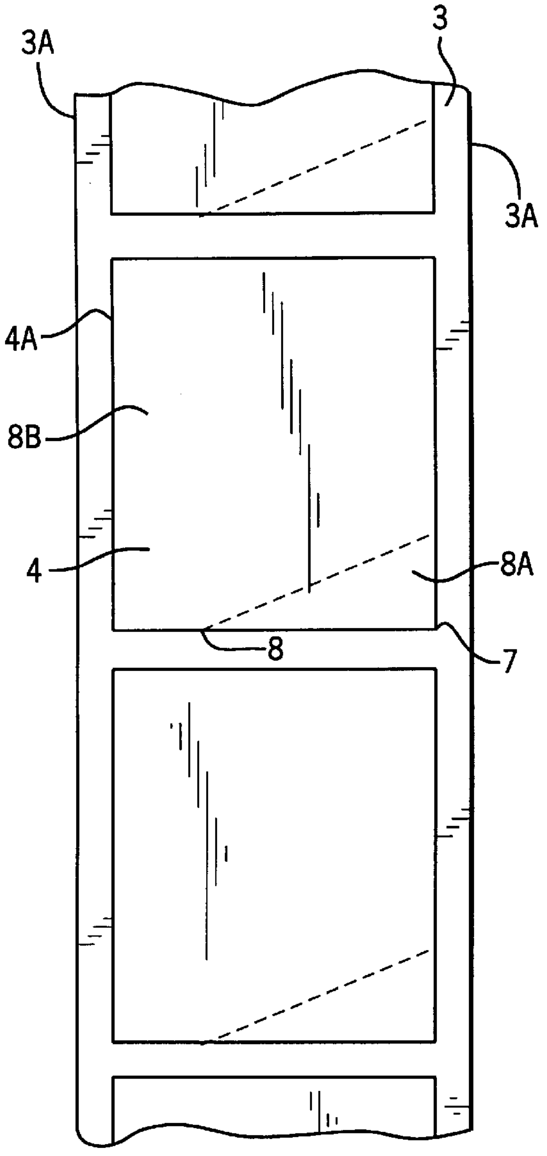
FIG. 11 shows another alternative embodiment of the front side of an enlarged portion of the unrolled end of the adhesive sheet assembly 1 in which each adhesive sheet 4 has a smaller triangular cover piece 5 in hidden view behind each adhesive sheet.
Figure 12:
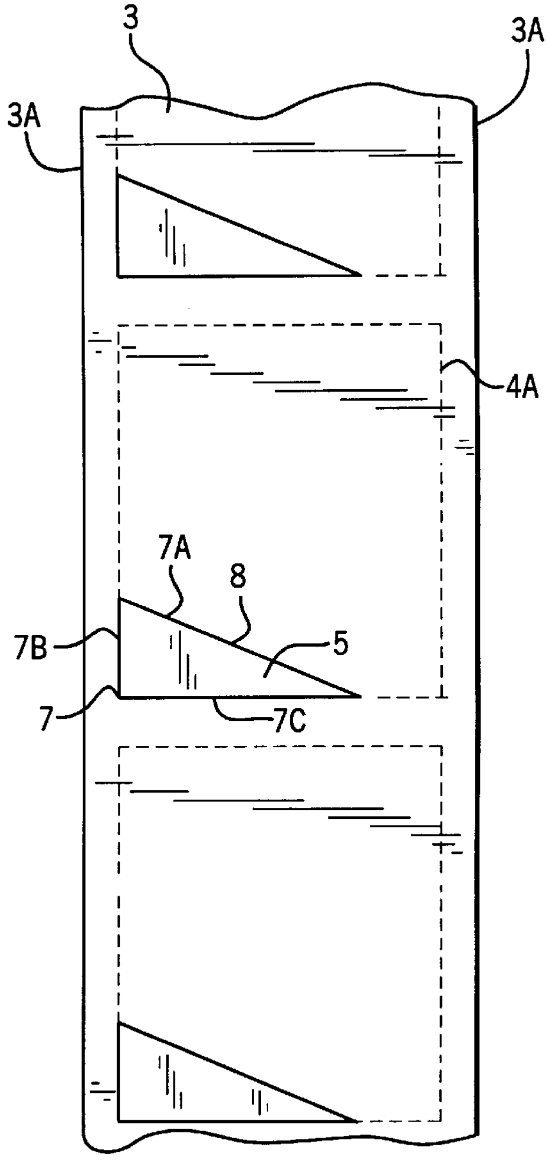
FIG. 12 shows the back side of the enlarged portion of the unrolled end of the adhesive sheet assembly 1 shown in FIG. 11 in which each smaller triangular cover piece 5 is in exposed view.

FIGS. 11 and 12 show the front and back sides, respectively, of another alternative embodiment of an enlarged portion of the unrolled end of the adhesive sheet assembly 1 in which each adhesive sheet 4 has a smaller triangular cover piece 5 shown in hidden view in FIG. 11 and in exposed view in FIG. 12. Transverse score line 8 divides adhesive sheet 4 into a first portion 8A and a second portion 8B. Cut out peripheral edges 7B and 7C correspond to the portions of the length of cut out peripheral edge 7 that are substantially in registration with the outer peripheral edge 4A of adhesive sheet 4. Cut out peripheral edge 7 does not intersect the two substantially parallel outer side edges 3A of carrier 3.

Figure 13:
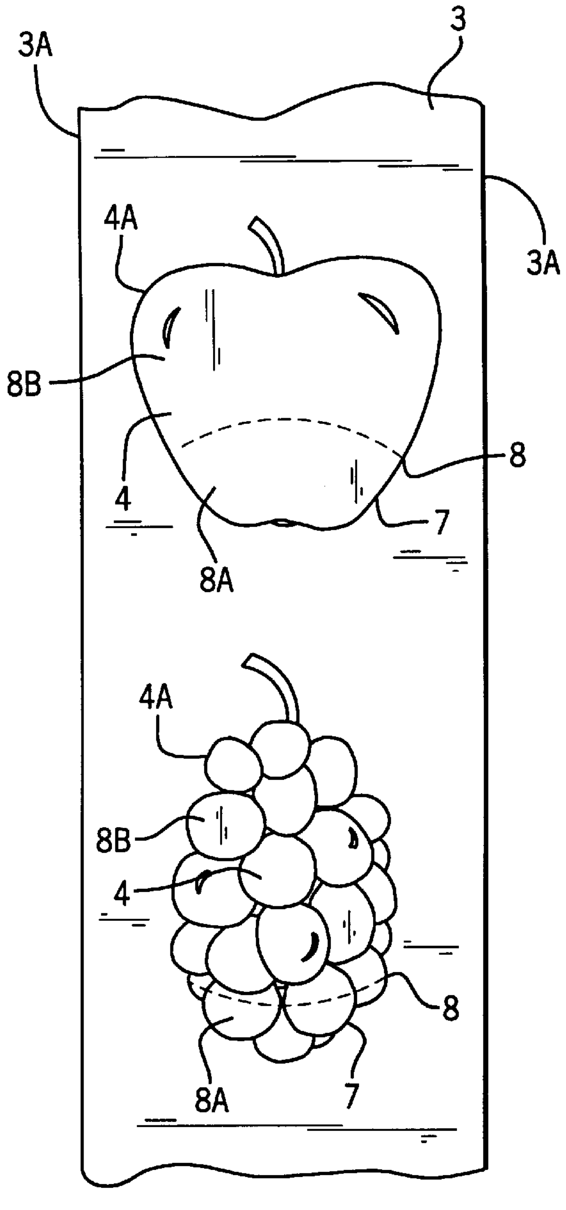
FIG. 13 shows yet another alternative embodiment of the front side of an enlarged portion of the unrolled end of an adhesive sheet assembly in which each adhesive sheet 4 is cut in a nonrectangular shape, in this illustration an apple and a bunch of grapes, respectively, in which cover piece 5 is in hidden view behind each adhesive sheet.
Figure 14:
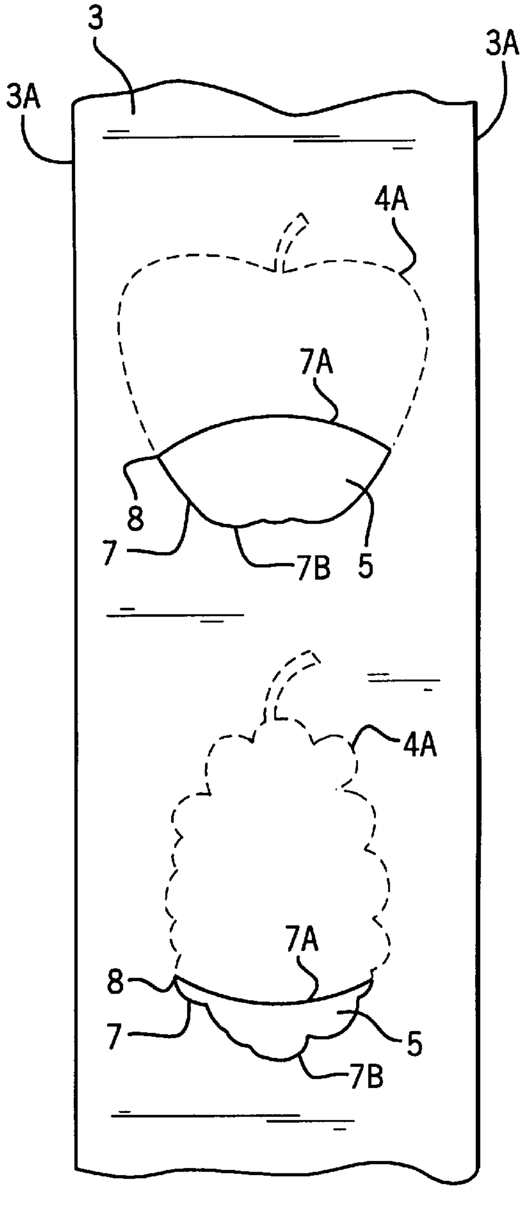
FIG. 14 shows the back side of the enlarged portion of the unrolled end of the adhesive sheet assembly shown in FIG. 13 in which each cover piece 5 is in exposed view.

FIGS. 13 and 14 show yet another alternative embodiment of the front side of an enlarged portion of the unrolled end of an adhesive sheet assembly in which each adhesive sheet 4 is cut in a nonrectangular shape, in this illustration an apple and a bunch of grapes, respectively, in which cover piece 5 is in hidden view in FIG. 13 and in exposed view in FIG. 14. Transverse score line 8 divides adhesive sheet 4 into a first portion 8A and a second portion 8B. Cut out peripheral edge 7B corresponds to the portions of the length of cut out peripheral edge 7 that are substantially in registration with the outer peripheral edge 4A of adhesive sheet 4. Cut out peripheral edge 7 does not intersect the two substantially parallel outer side edges 3A of carrier 3.

FIGS. 13 and 14 illustrate that the adhesive sheets and their corresponding cover pieces can be cut to any shape, such as animals, plants, fruit, symbols, etc., which can be of particular utility in applications involving children, including, for example, games and learning aids, especially in view of the effective, but nonpermanent, adhesiveness of the adhesive sheets of this invention.

Adhesives that may be used as the adhesive sheet adhesive in the present invention are illustrated by the examples which follow. These examples are not to be construed as limiting the scope of the invention, which is defined by the appended claims.

TEST METHODS

Test for Conformability

A sample of the rectangular adhesive sheet measuring 0.5 inch by 1.5 inch is applied to a clean, polished half-inch diameter stainless steel cylinder such that the short side is oriented along the axis of the cylinder and the long side is oriented along the circumference of the cylinder, known as "flagging". The cylinder is then exposed to a temperature of 77°±°5 F. and a relative humidity not greater than 80% for a period of 10 hours.

Conformability failure is indicated by opening up of the flags, i.e., visible edge separation, at the conclusion of the 10 hour test. It is a pass/fail test.

Test for Cohesive Strength

Cohesive strength may be determined indirectly by measuring the shear strength of the adhesive according to ASTM D3654-88, also known as PSTC-7, and recording whether adhesive is left on both the adhesive sheet and the panel to which it was adhered after failure. In this case, PSTC-7 has been modified to use 1×0.5 inch samples. A sample of the rectangular adhesive sheet measuring 1×0.5 inch is applied to a vertical stainless steel panel with a 0.5 inch overlap joint. A mass of 1000 g is suspended from the sample and the time until failure is measured in an environment having a temperature of 23° C. and a relative humidity of 50 percent. A determination is then made whether adhesive is left on both the tape and the panel by visual inspection. If there is, the test shows cohesive failure.

If there is no adhesive left on the panel, the test indicates adhesive failure to the panel, i.e., the cohesive strength is greater the shear strength of the bond to the panel, and the adhesive passes the test for cohesive strength.

If there is some or no adhesive left on the adhesive sheet and it has been transferred to the panel, the test does not provide information about the cohesive strength of the adhesive, but rather shows failure of the adhesive to form a sufficient adhesive bond to the backing material of the adhesive sheet. This indicates the need for either another adhesive, another backing material, or the need to pre-treat the surface of the backing material to be coated with adhesive such that it forms a stronger bond with the adhesive, such as with a sizing agent.

EXAMPLES

The following are examples of formulations of adhesives which are useful for making the adhesive sheet assemblies according to the present invention. These formulations may be coated or transferred onto any of the films, sheets or cloths described above as useful for making the adhesive sheets.

TABLE I

COMPOSITION OF FORMULATIONS A, B AND C IN WEIGHT-PERCENT

| INGREDIENT | A | B | C |
|---|---|---|---|
| Heveacrumb ™ SMR-5LX Lamco[1] | 3.86 | — | 10.18 |
| Synpol ™ Type 1011A[2] | 11.58 | 17.02 | — |
| Vistanex MM-L-80[3] | — | — | 2.60 |
| Foral ™ 105[4] | 18.52 | 15.32 | — |
| Piccolyte S-115[5] | — | — | 14.73 |
| Herolyn Dphu 6 | — | — | 3.12 |
| Indopol H-100[7] | — | — | 3.12 |
| Santovar ™ A[8] | 0.15 | 0.09 | — |
| Agarite ™ Resin D[9] | 0.08 | 0.09 | — |
| Wingstay ™ L Powder[10] | — | — | 0.14 |
| ASARCO ™ ZO-77T[11] | 7.72 | 8.51 | 0.64 |
| Methyl Zimate[12] | 0.62 | 0.68 | 0.50 |
| Sulfads ™ Powder[13] | 0.04 | 0.04 | — |
| Tween ™ 20[14] | — | — | 0.12 |
| K-1717B[15] | — | — | 1.22 |
| Solvent | balance | balance | balance |

[1]Natural rubber elastomer available from Herron & Meyer
[2]Styrene butadiene copolymer elastomer available from American Synpol Corp.
[3]Polyisobutylene elastomer available from Exxon Chemical
[4]Rosin ester tackifier available from Hercules, Inc.
[5]Polyterpener resin tackifier available from Hercules, Inc.
[6]Hydrogenated methyl ester of rosin tackifier available from Hercules, Inc.
[7]Polybutene tackifier available from Amoco Chemical Corp.
[8]2,5-di-tert-amylhydroquinone antioxidant available from Flexsys America L.P.
[9]Antioxidant available from R.T. Vanderbilt Co.
[10]Antioxidant available from Goodyear Tire & Rubber Co.
[11]Zinc oxide curing agent available from Jenson-Souders Assocs., Inc.
[12]Zinc dimethyldithiocarbamate accelerator available from R.T. Vanderbilt Co.
[13]Dipentatnethylene thiuram hexasulfide accelerator available from R.T. Vanderbilt Co.
[14]Polysorbate 20 surfactant available from ICI Specialties Mfg.
[15]Polyketone resin plasticizer available from Lawter Chemical, Inc.

Formulation D

An acrylic-based adhesive formulation D is prepared by combining 99.72 wt % Duro-Tak™ 80-1047 (an acrylic resin available from National Starch and Chemical Co.) with 0.17 wt % Uformite-27-803 (a melamine resin curing agent available from Reichhold Chemical Coating Div.) in an appropriate solvent (balance).

Formulation E

Another acrylic-based adhesive formulation is prepared by diluting Aroset™ 1044-Z-40 (an acrylic resin adhesive available from Ashland Chemical, Inc.) with an appropriate solvent so that the resin comprises 39–41 wt % of the formulation.

Formulation F

Yet another acrylic-based adhesive formulation F is prepared by diluting Aroset™ 1085-Z-38 (an acrylic resin adhesive also available from Ashland Chemical) with an appropriate solvent so that the resin comprises 36.5–38.5 wt % of the formulation.

Another aspect of this invention is a process for making the adhesive sheet assembly of the present invention comprising:

A. Adhering a continuous carrier having two substantially parallel side edges extending in a longitudinal direction to the back side of a continuous flexible polymer film, polymer-reinforced sheet or cloth having a Taber stiffness of not less than 0.03 measured according to ASTM D747 A and having two substantially parallel side edges extending in a longitudinal direction, a front side facing away from the carrier capable of receiving markings, a back side facing toward the carrier substantially covered with a pressure sensitive adhesive such that the carrier substantially covers the pressure-sensitive adhesive to form a continuous web having a front side capable of receiving markings, a continuous carrier on the back side, and two substantially parallel side edges extending in a longitudinal direction of the web;

B. Scoring the front side of the web to serially cut out spaced apart adhesive sheets adhered to the carrier; and C. Scoring the back side of the web to cut out a cover piece from the web having an outer peripheral edge which has at least 40 percent of its total length in registration with the scoring of step B, wherein the pressure sensitive adhesive has an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000 and each adhesive sheet is capable of being removed from a substrate to which it is adhered without leaving an adhesive residue on the substrate.

In one embodiment of the process of this invention, the scoring of step C not in substantial registration with the scoring of step B is preferably carried out before carrying out the scoring in substantial registration with the scoring of step B. The scoring of step B in substantial registration with the scoring of step C may also be carried out after the scoring of step C not in substantial registration with the scoring of step B and together with the scoring in step C in substantial registration with the scoring of step B.

Steps B and C are preferably carried out on both sides of the web simultaneously, such as by applying a first die adapted to cut the required score lines on the front side of the web to the first side of the web and, at the same time, applying a second die adapted to cut the required score lines on the back side of the web to the back side of the web. The first and second dies may be positioned across the web from each other or offset.

The scoring of steps B and C may be carried out continuously on both sides of the web at substantially the same location by feeding the web between a first rotary die and a second rotary die, such that the first rotary die is positioned over the front side of the web and second rotary die is positioned over the back side of the web, the first rotary die adapted to cut the score lines of step B and second rotary die adapted for cutting the score lines of steps C.

The web formed in step A may be cut to form a plurality of webs, each having two substantially parallel side edges extending in a longitudinal direction of the web from the first end to the second end. The plurality of webs may be processed through steps B and C simultaneously, if desired, or the web formed in step A may be cut to form a plurality of webs as above after conducting steps B and C, steps B and C being used to generate a plurality of columns of adhesive sheets for separation into individual adhesive sheet assemblies by cutting the web into a plurality of webs corresponding in number to the number of columns of adhesive sheets.

The adhesive sheet assemblies described herein are useful for posting notes in an industrial setting, including production plants, research and development laboratories, construction sites, warehouses, and other non-office environments. They are also useful in the office environment for applications in which typical repositionable notes are not sufficiently robust, such as for posting on shelving and office equipment. The adhesive sheets may be blank or may be pre-printed with words, logos or other insignia.

Printing insignia on the adhesive sheets may be carried out on an as needed basis by feeding the adhesive sheet assembly into a thermal printer, preferably so that the portion of the adhesive sheet without the cover piece (illustrated by the second portion 8B of each adhesive sheet 4 in the drawings) enters the printer before the portion of the adhesive sheet with the cover piece adhered to it (illustrated by the first portion 8A of each adhesive sheet 4 in the drawings). In that way, adhesive sheets with insignia may be generated on demand, preferably with the aid of a computer, for only the number of adhesive sheets needed, reducing waste caused by overruns and reducing or eliminating the need for storage space for different types of adhesive sheets.

In one embodiment, the process for making printed adhesive sheets on demand comprises:

A. Feeding the adhesive sheet assembly of the present invention into a printer adapted for receiving the adhesive sheet assembly and for receiving signals from a computer and B. Sending electronic signals to the printer from the computer directing the printer to print a selected insignia on a specified number of adhesive sheets in the adhesive sheet assembly.

Although the invention has been described in considerable detail through the preceding specific embodiments, it is to be understood that these embodiments are for purpose of illustration only. Many variations and modifications can be made by one skilled in the art without departing from the spirit and scope of the invention.

What is claimed is:

1. An adhesive sheet assembly comprising:

a continuous carrier of flexible sheet material in roll form, the carrier having two substantially parallel side edges extending in a longitudinal direction of the carrier;

a series of longitudinally spaced adhesive sheets on the carrier, each adhesive sheet having a front side facing away from the carrier capable of receiving markings, a back side facing toward the carrier substantially covered with a pressure sensitive adhesive, the back side having a first portion and a second portion;

a continuous cut in the carrier defining, for each adhesive sheet, one cover piece cut from the carrier such that the cover piece has an outer peripheral edge within the first portion on the backside of the adhesive sheet, so that the cover piece may be separated from the carrier and retained on the first portion of the backside of the adhesive sheet without extending beyond the outer peripheral edge of the adhesive sheet when the adhesive sheet is peeled off the carrier due to adhesion between the cover piece and the adhesive sheet, wherein at least 40 percent of the total length of the outer peripheral edge of each cover piece is substantially in registration with the outer peripheral edge of the adhesive sheet to which it is adhered;

the continuous cut does not extend through the substantially parallel side edges of the continuous carrier; and each longitudinally spaced adhesive sheet on the carrier is not perforated or cut parallel to the outer peripheral edge of the cover piece adhered to that adhesive sheet; or each adhesive sheet comprises a flexible polymer film, polymer-reinforced sheet or cloth having a Taber stiffness of not less than 0.03 measured according to ASTM D747 A;

the pressure sensitive adhesive has an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000; and each adhesive sheet is capable of being removed from a substrate to which it is adhered without leaving a substantial amount of residue on the substrate.

2. The assembly of claim 1, wherein the film, sheet or cloth has a tensile strength of at least 2000 N/m and a minimum elongation of 4 percent, each measured according to ASTM D1000.

3. The assembly of claim 1, wherein the film, sheet or cloth has a tensile strength of at least 5000 N/m and a minimum elongation of at least 50 percent, each measured according to ASTM D1000.

4. The assembly of claim 1, wherein the adhesive comprises an acrylic-based polymer.

5. The assembly of claim 1, wherein the adhesive comprises an elastomer and a tackifier.

6. The assembly of claim 5, wherein the elastomer is a natural rubber, an elastomeric block copolymer or polyisobutylene elastomer, or a combination of two or more thereof.

7. The assembly of claim 6, wherein the elastomer is a combination of a natural rubber and a styrene/isoprene block copolymer.

8. The assembly of claim 7, wherein the weight ratio of tackifier to elastomer is greater than 0.8:1.

9. The assembly of claim 8, wherein the tackifier is a rosin ester.

10. A kit for dispensing a series of adhesive sheets from a continuous carrier of flexible sheet material in roll form comprising the adhesive sheet assembly of claim 1 and a dispenser adapted for holding the adhesive sheet assembly, allowing the adhesive sheet assembly to rotate about the axis of the roll form, and serially presenting each adhesive sheet for removal by pulling on the first portion of each adhesive sheet.

11. The kit of claim 10, wherein the dispenser is a container adapted for substantially enclosing the adhesive sheet assembly, the dispenser having a top and a bottom and an opening at or near the top for dispensing the first end of the continuous carrier.

12. A process for making the adhesive sheet assembly of claim 1 comprising:

A. Adhering a continuous carrier having a back side and a front and two substantially parallel side edges extending in a longitudinal direction to the back side of a continuous flexible polymer film, polymer-reinforced sheet or cloth having a Taber stiffness of not less than 0.03 measured according to ASTM D747 A and having two substantially parallel side edges extending in a longitudinal direction, a front side facing away from the carrier capable of receiving markings, a back side facing toward the back side of the carrier substantially covered with a pressure sensitive adhesive such that the carrier substantially covers the pressure-sensitive adhesive to form a continuous web having a front side capable of receiving markings, wherein the continuous carrier is located on the back side of the continuous flexible polymer film, polymer-reinforced sheet or cloth, and two substantially parallel side edges extending in a longitudinal direction of the web;

B. Scoring the front side of the continuous flexible polymer film, polymer-reinforced sheet or cloth to serially cut out longitudinally spaced apart adhesive sheets adhered to the carrier; and C. Scoring the front side of the carrier to cut out a cover piece from the carrier adhered to each of the adhesive sheets and having an outer peripheral edge which has at least 40 percent of its total length in registration with the scoring of step B, wherein the pressure sensitive adhesive has an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000 and each adhesive sheet is capable of being removed from a substrate to which it is adhered without leaving a substantial amount of residue on the substrate; and wherein the adhesive sheets are not scored parallel to the outer peripheral edge of the cover piece adhered to each adhesive sheet.

13. The process of claim 12, wherein the scoring of step C not in substantial registration with the scoring of step B is carried out before carrying out the scoring in substantial registration with the scoring of step B.

14. The process of claim 13, wherein the scoring of step B in substantial registration with the scoring of step C is carried out after the scoring of step C not in substantial registration with the scoring of step B and together with the scoring in step C in substantial registration with the scoring of step B.

15. A process for making the adhesive sheet assembly of claim 1 comprising:

A. Adhering a continuous carrier having a back side and a front side and two substantially parallel side edges extending in a longitudinal direction to the back side of a continuous flexible polymer film, polymer-reinforced sheet or cloth having a Taber stiffness of not less than 0.03 measured according to ASTM D747 A and having two substantially parallel side edges extending in a longitudinal direction, a front side facing away from the carrier capable of receiving markings, a back side facing toward the back side of the carrier substantially covered with a pressure sensitive adhesive such that the carrier substantially covers the pressure-sensitive adhesive to form a continuous web having a front side capable of receiving markings, wherein the continuous carrier is located on the back side of the continuous flexible polymer film, polymer-reinforced sheet or cloth, and two substantially parallel side edges extending in a longitudinal direction of the web;

B. Scoring the front side of the continuous flexible polymer film, polymer-reinforced sheet or cloth to serially cut out longitudially spaced apart adhesive sheets adhered to the carrier; and C. Scoring the front side of the carrier to cut out a cover piece from the carrier adhered to each of the adhesive sheets and having an outer peripheral edge which has at least 40 percent of its total length in registration with the scoring of step B, wherein the pressure sensitive adhesive has an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000 and each adhesive sheet is capable of being removed from a substrate to which it is adhered without leaving a substantial amount of residue on the substrate; and wherein step B and step C are carried out on both sides of the web simultaneously.

16. The process of claim 15, wherein the scoring of steps B and C is carried out continuously on both sides of the web at substantially the same location by feeding the web between a first rotary die and a second rotary die, such that the first rotary die is positioned over the front side of the web and second rotary die is positioned over the back side of the web, the first rotary die adapted to cut the score lines of step B and second rotary die adapted for cutting the score lines of steps C.

17. The process of claim 12, wherein the web formed in step A is cut to form a plurality of webs, each having two substantially parallel side edges extending in a longitudinal direction of the web from the first end to the second end.

18. A process for making printed adhesive sheets on demand comprising:

A. Feeding the adhesive sheet assembly of claim 1 into a printer adapted for receiving the adhesive sheet assembly and for receiving signals from a computer and B. Sending electronic signals to the printer from the computer directing the printer to print a selected insignia on a specified number of adhesive sheets in the adhesive sheet assembly.

19. An adhesive sheet assembly comprising:

a continuous carrier of flexible sheet material in roll form, the carrier having two substantially parallel side edges extending in a longitudinal direction of the carrier;

a series of longitudinally spaced adhesive sheets on the carrier, each adhesive sheet having a front side facing away from the carrier capable of receiving markings, a back side facing toward the carrier substantially covered with a pressure sensitive adhesive, the back side having a first portion and a second portion;

a continuous cut in the carrier defining, for each adhesive sheet, one cover piece cut from the web such that the cover piece has an outer peripheral edge within the first portion on the backside of the adhesive sheet, so that the cover piece may be separated from the carrier and retained on the first portion of the backside of the adhesive sheet without extending beyond the outer peripheral edge of the adhesive sheet when the adhesive sheet is peeled off the carrier due to adhesion between the cover piece and the adhesive sheet, wherein at least 40 percent of the total length of the outer peripheral edge of each cover piece is substantially in registration with the outer peripheral edge of the adhesive sheet to which it is adhered;

the continuous cut does not extend through the substantially parallel side edges of the continuous carrier; and each longitudinally spaced adhesive sheet on the carrier is not perforated or cut parallel to the outer peripheral edge of the cover piece adhered to that adhesive sheet; or each adhesive sheet comprises a flexible polymer film, polymer-reinforced sheet or cloth; and each adhesive sheet is capable of being removed from a substrate to which it is adhered without leaving a substantial amount of residue on the substrate.

* * * * *